(12) United States Patent
Uchida (10) Patent No.: US 9,739,438 B2
(45) Date of Patent: Aug. 22, 2017

(54) VEHICLE LAMP

(75) Inventor: Naoki Uchida, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 967 days.

(21) Appl. No.: 13/284,063

(22) Filed: Oct. 28, 2011

(65) Prior Publication Data

US 2012/0106187 A1 May 3, 2012

(30) Foreign Application Priority Data

Oct. 28, 2010 (JP) ................. 2010-241886

(51) Int. Cl.
| | |
|---|---|
| *F21V 7/04* | (2006.01) |
| *F21S 8/10* | (2006.01) |
| *B60Q 1/00* | (2006.01) |

(52) U.S. Cl.
CPC ........ *F21S 48/1159* (2013.01); *B60Q 1/0035* (2013.01); *B60Q 1/0041* (2013.01); *F21S 48/1266* (2013.01); *F21S 48/1275* (2013.01); *F21S 48/321* (2013.01); *F21S 48/328* (2013.01); *B60Q 2400/30* (2013.01)

(58) Field of Classification Search
CPC ............... F21S 48/1159; F21S 48/1266; F21S 48/1275; F21S 48/321; F21S 48/328; B60C 1/0035; B60C 1/0041; B60C 2400/30
USPC ....... 362/516, 487, 507, 509, 525, 538, 511, 362/501, 543–545, 520–522, 494, 539
See application file for complete search history.

(56) References Cited

U.S. PATENT DOCUMENTS

| | | | |
|---|---|---|---|
| 6,882,110 B2* | 4/2005 | Ishida et al. .................... 315/82 |
| 6,891,333 B2* | 5/2005 | Tatsukawa et al. ............. 315/82 |
| 7,311,430 B2* | 12/2007 | Tsukamoto et al. .......... 362/545 |
| 7,387,417 B2* | 6/2008 | Sazuka et al. ................ 362/544 |
| 7,419,290 B2* | 9/2008 | Inaba ............................ 362/538 |
| 7,540,638 B2 | 6/2009 | Dassanayake et al. |

(Continued)

FOREIGN PATENT DOCUMENTS

| | | |
|---|---|---|
| CN | 101153693 A | 4/2008 |
| EP | 2187115 A2 | 5/2010 |

(Continued)

OTHER PUBLICATIONS

Machine Translation of JP 2010-073426 A.*

(Continued)

*Primary Examiner* — Laura Tso
*Assistant Examiner* — Naomi M Wolford
(74) *Attorney, Agent, or Firm* — Osha Liang LLP (57) ABSTRACT

A vehicle lamp includes a lamp outer case, a reflection-type first lamp unit, a direct emission-type second lamp unit, and a compound lens. The lamp outer case includes a cover and a lamp housing. The first lamp unit has a first light source, a reflector and a shade and forms a collective optical system. The second lamp unit has a second light source, which directly emits light, and forms a defuse optical system. The compound lens is disposed along an inner surface of the cover, and has an outer surface facing the inner surface of the cover that is formed as a curved light emitting surface. The cover also includes first and second control portions. The light emitting surface has a shape which is displaced to the rear as it extends transversely outwards of a vehicle.

9 Claims, 5 Drawing Sheets

(56) References Cited

U.S. PATENT DOCUMENTS

| | | | |
|---|---|---|---|
| 7,686,488 B2* | 3/2010 | Inoue et al. | 362/509 |
| 7,918,594 B2* | 4/2011 | Watanabe et al. | 362/507 |
| 2004/0208020 A1* | 10/2004 | Ishida | 362/545 |
| 2005/0195074 A1* | 9/2005 | Kano | 340/475 |
| 2006/0146555 A1* | 7/2006 | Inaba | 362/494 |
| 2007/0064435 A1* | 3/2007 | Weller et al. | 362/494 |
| 2007/0247865 A1* | 10/2007 | Kinoshita et al. | 362/538 |
| 2009/0231873 A1 | 9/2009 | Kotajima et al. | |
| 2010/0232173 A1* | 9/2010 | Ohno et al. | 362/538 |
| 2011/0170307 A1* | 7/2011 | Ishikawa et al. | 362/516 |

FOREIGN PATENT DOCUMENTS

| | | | |
|---|---|---|---|
| JP | 05-090703 U | | 12/1993 |
| JP | 2004-095481 A | | 3/2004 |
| JP | 2004-306851 A | | 11/2004 |
| JP | 2005141919 A | | 6/2005 |
| JP | 2005-347144 A | | 12/2005 |
| JP | 2007-213877 A | | 8/2007 |
| JP | 2010073426 A | * | 4/2010 |
| JP | 2010-118203 A | | 5/2010 |
| JP | 2010-118241 A | | 5/2010 |
| JP | 2010-218964 A | | 9/2010 |
| JP | 2010212148 A | | 9/2010 |

OTHER PUBLICATIONS

English Patent Abstract of JP 2004-095481 from Esp@cenet, Published Mar. 25, 2004 (2 Pages).
English Patent Abstract of JP 2005-141919 from Esp@cenet, Published Jun. 2, 2005 (1 Page).
Office Action Issued in Korean Application No. 10-2011-0108595, Dated Jan. 8, 2013 (8 Pages With English Translation).
Office Action in counterpart Chinese Patent Application No. 201110337484.5 issued Jan. 2, 2014 (15 pages).
Japanese Office Action for Application No. 2010-241886, mailed on Jul. 29, 2014 (11 pages).
Office Action in counterpart Japanese Patent Application No. 2010-241886 mailed on Apr. 15, 2014 (6 pages).
Notification of Reasons for Refusal issued in Japanese Application No. 2014-220188, mailed on Jul. 28, 2015 (7 pages).

* cited by examiner

VEHICLE LAMP

CROSS REFERENCE TO RELATED APPLICATION(S)

The present disclosure relates to the subject matters contained in Japanese Patent Application No. 2010-241886 filed on Oct. 28, 2010, which are incorporated herein by reference in its entirety.

FIELD

The present invention relates to a vehicle lamp and more particularly to a technical field in which an increase in the functionality of a vehicle lamp may be realized by disposing a second lamp unit which constitutes a diffuse optical system on an external side of a first lamp unit which constitutes a collective optical system.

BACKGROUND

There are vehicle lamps in which a plurality of light sources are disposed so as to be aligned vertically and horizontally and the plurality of light sources are controlled individually to be turned on and off so as to form a desired light distribution pattern for a specific situation (see JP-A-2004-95481 and JP-A-2005-141919, for instance).

In the vehicle lamps described in JP-A-2004-95481 and JP-A-2005-141919, a plurality of lamp units are disposed which are controlled individually, and for example, various different light distribution patterns can be formed as of a headlamp by a lamp unit which forms a horizontal cut-off line of a light distribution pattern and a lamp unit which emits diffuse light.

In the vehicle lamps described in JP-A-2004-95481 and JP-A-2005-141919, however, the external shape of the vehicle lamp is not particularly taken into consideration. Therefore, an increase in size of the vehicle lamp is required due to the positions and shapes of the plurality of lamp units.

In addition, vehicle lamps are disposed individually at left- and right-hand sides of a vehicle, and there may be a case where directions in which light is emitted from the lamp units are different. In addition, a plurality of lamp units constitute individual optical systems having different functions such as a collective optical system and a diffuse optical system, and therefore, there may be fears that respective functionalities of the lamp units deteriorate based on a state in which the lamp units are disposed.

SUMMARY

One or more embodiments of the present invention provides a vehicle lamp which can realize a reduction in size and an increase in functionality thereof.

According to one or more embodiments of the invention, there is provided a vehicle lamp including a lamp outer case made up of a cover and a lamp housing, a reflection-type first lamp unit having a first light source, a reflector which reflects light emitted from the first light source and a shade which cuts off part of light emitted from the first light source and forming a collective optical system, a direct emission-type second lamp unit having a second light source, which directly emits shining light, wherein the second lamp unit is disposed on an external side of the first lamp unit and forms a diffuse optical system and a compound lens disposed along an inner surface of the cover, wherein an outer surface of the compound lens facing the inner surface of the cover is formed as a light emitting surface and is formed into a curved surface, wherein a first control portion and a second control portion are provided on an inner surface of the compound lens, wherein the inner surface of compound lens faces the first lamp unit and the second lamp unit so that the first control portion and the second control portion control light emitted from the first source and light emitted from the second light source, respectively, and wherein the light emitting surface of the compound lens is formed into a shape which is displaced to the rear as it extends transversely outwards of a vehicle.

Consequently, in the vehicle lamp, light emitted from the first lamp unit and light emitted from the second lamp unit which is disposed on the external side of the first lamp unit are controlled individually by the respective control portions of the compound lens.

According to a first aspect of the invention, there is provided a vehicle lamp including the lamp outer case made up of the cover and the lamp housing, the reflection-type first lamp unit having the first light source, the reflector which reflects light emitted from the first light source and the shade which cuts off part of light emitted from the first light source and forming the collective optical system, the direct emission-type second lamp unit having the second light source, which directly emits shining light, wherein the second lamp unit is disposed on the external side of the first lamp unit and forms the diffuse optical system and a compound lens disposed along an inner surface of the cover, wherein an outer surface of the compound lens facing the inner surface of the cover is formed as a light emitting surface and is formed into a curved surface, wherein a first control portion and a second control portion are provided on an inner surface of the compound lens, wherein the inner surface of compound lens faces the first lamp unit and the second lamp unit so that the first control portion and the second control portion control light emitted from the first source and light emitted from the second light source, respectively, and wherein the light emitting surface of the compound lens is formed into a shape which is displaced to the rear as it extends transversely outwards of a vehicle.

Consequently, since the second lamp unit is disposed on the external side of the reflection-type first lamp unit which forms the collective optical system, the first lamp unit is disposed so as to correspond to the portion where the inclination of the light emitting surface is small, whereby a desired light distribution pattern when light is emitted from the first lamp unit can easily be formed, thereby making it possible to realize an increase in the functionality of the vehicle lamp.

In addition, since the light emitting surface having the curved surface shape is formed into the shape which is displaced to the rear as it extends transversely outwards of the vehicle, the compound lens can be disposed along the inner surface of the cover, thereby making it possible to realize a reduction in size of the vehicle lamp.

According to a second aspect of the invention, there is provided a vehicle lamp as set forth in the first aspect, wherein at least an additional lamp unit having a different function from those of the first lamp unit and the second lamp unit is disposed on an external side of the second lamp unit.

Consequently, a further increase in the functionality of the vehicle lamp can be realized.

According to a third aspect of the invention, there is provided a vehicle lamp as set forth in the second aspect, wherein a control portion is provided on the compound lens for controlling light emitted from the additional lamp unit.

Consequently, a desired light distribution pattern can easily be formed by light emitted from the additional lamp unit.

BRIEF DESCRIPTION OF THE DRAWINGS

Embodiments of the invention will be described with reference to the drawings. The drawings and the associated descriptions are provided to illustrate embodiments of the invention and should not limit the scope of the invention.

FIG. 1 together with FIGS. 2 to 5, show an exemplary embodiment of the invention.

DETAILED DESCRIPTION OF THE EMBODIMENTS

Hereinafter, exemplary embodiments of a vehicle lamp of the invention will be described by reference to accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
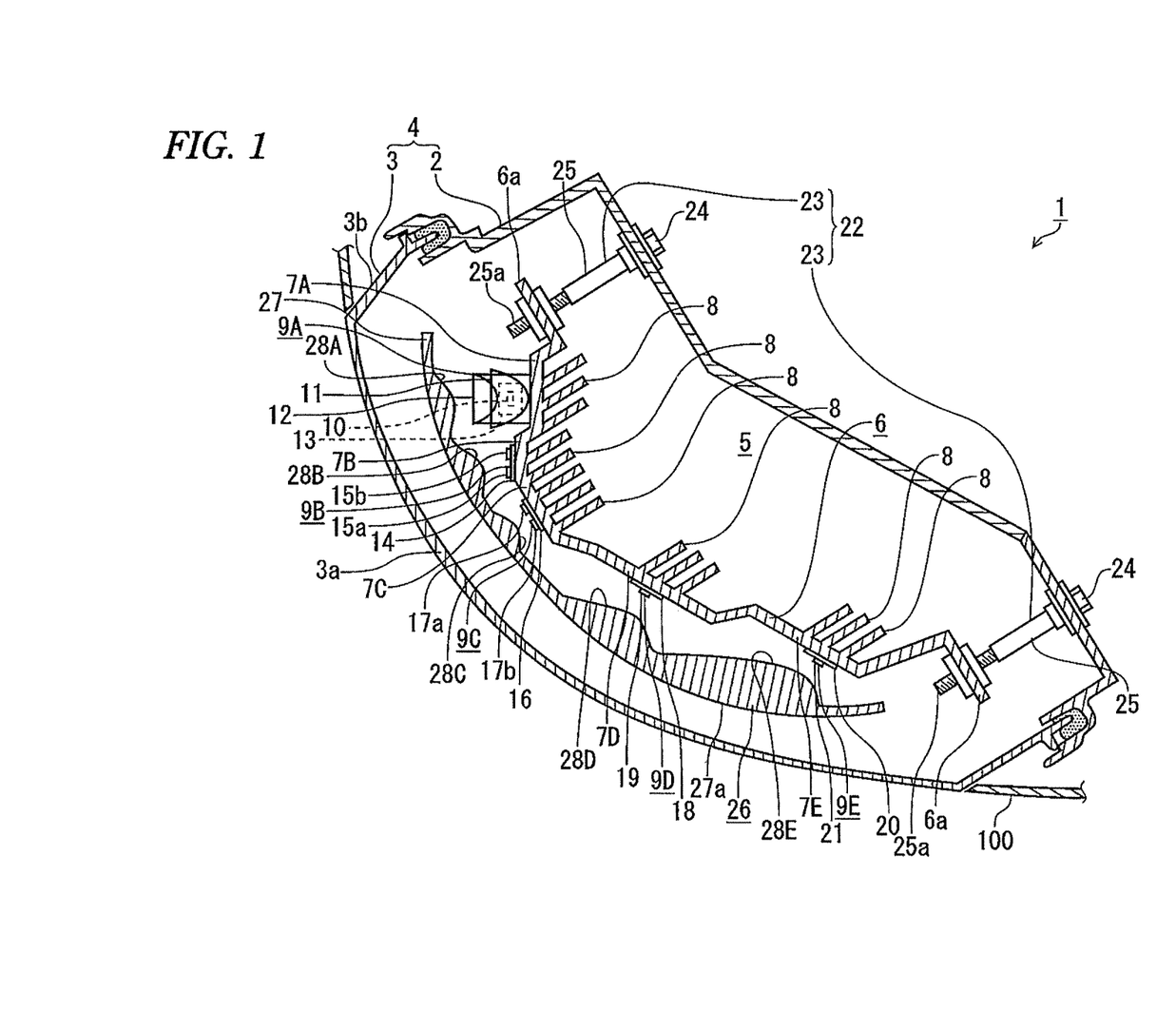
FIG. 1 is a schematic horizontal sectional view of a vehicle lamp of the invention.

A vehicle lamp 1 is, for example, a lamp which functions as at least a vehicle headlamp and is disposed at each of left- and right-hand sides of a front end of a vehicle body 100 (refer to FIG. 1). FIG. 1 shows the vehicle lamp 1 which is disposed at the left-hand side of the front end of the vehicle body 100.

The vehicle lamp 1 includes a lamp housing 2 having a recess portion which is opened generally toward the front and a cover 3 which closes an open side of the lamp housing 2, the lamp housing 2 and the cover 3 making up a lamp outer case 4. An interior of the lamp outer case 4 is formed as a lamp compartment 5.

The cover 3 includes a light transmitting portion 3a and mounted portions 3b, which project from an outer circumferential portion of the light transmitting portion 3a towards the lamp housing 2, the light transmitting portion 3a and the mounted portions 3b being formed integrally. Then, the mounted portions 3b are mounted on the lamp housing 2 at respective distal end portions thereof.

The light transmitting portion 3a is formed into a moderately curved surface which is convex obliquely towards the front. The light transmitting portion 3a is also formed into a shape which is displaced towards the rear as it extends transversely towards an external side and vertically upwards.

A mount member 6, which is formed of a metal material having a high heat dissipating capability, is disposed in the lamp compartment 5. The mount member 6 has a shape which generally matches the shape of the light transmitting portion 3a of the cover 3, and front and rear end portion at an upper end portion and a rear end portion of a lower end portion of the mount member 6 are provided as connecting portions 6a, 6a, and 6a. For example, five mount portions are provided on the mount member 6, which include a first mount portion 7A, a second mount portion 7B, a third mount portion 7C, a fourth mount portion 7D and a fifth mount portion 7E.

The first mount portion 7A is situated at a transversely innermost side, and the second mount position 7E, the third mount position 7C, the fourth mount position 7D and the fifth mount position 7E are situated sequentially transversely outwards of the first mount portion 7A in that order. Surfaces of the first mount portion 7A and the second mount portion 73 which face the light transmitting portion 3a of the cover 3 are formed so as to be oriented toward the front. A surface of the third mount portion 7C which faces the light transmitting portion 3a is formed so as to be oriented obliquely leftwards relative to the front. Surfaces of the fourth mount portion 7D and the fifth mount portion 7E which face the light transmitting portion 3a are formed so as to be oriented generally towards the left.

The first mount portion 7A, the second mount portion 7B and the third mount portion 7C are formed substantially at the same position with respect to a front-to-rear direction of the vehicle. The fourth mount portion 7D is situated further rearwards than the first mount portion 7A, the second mount portion 7B and the third mount portion 7C, and the fifth mount portion 7E is situated further rearwards than the fourth mount portion 7D.

Heat dissipating fins 8, 8 . . . are provided on the mount member 6 so as to project from respective back sides of the first mount portion 7A to the fourth mount portion 7E.

A first lamp unit 9A, a second lamp unit 9B, a third lamp unit 9C, a fourth lamp unit 9D and a fifth lamp unit 9E are disposed in the lamp compartment 5. The first lamp unit 9A, the second lamp unit 9B, the third lamp unit 9C, the fourth lamp unit 9D and the fifth lamp unit 9E are mounted, respectively, on the surfaces of the first mount portion 7A, the second mount portion 7B, the third mount portion 7C, the fourth mount portion 7D and the fifth mount portion 7E which face the light transmitting portion 3a.

The first lamp unit 9A is a reflection-type lamp unit and has a first light source 10, a reflector 11 which reflects light emitted from the first light source 10 and a shade 12 which cuts off part of light emitted from the first light source 10, constituting a collective optical system. For example, a light emitting diode (LED) is used as the first light source 10, and the first light source 10 is disposed on a substrate 13.

The shade 12 is a so-called movable shade which can move. When light is emitted from the first light source 10, the shade 12 forms a so-called low beam light distribution pattern which illuminates a near field area and a so-called high beam light distribution pattern which illuminates a far field area in accordance with the position thereof. An upper surface of the shade 12 may be formed as a reflecting surface.

Light emitted from the first light source 10 of the first lamp unit 9A is reflected by the reflector 11 so as to be shone towards the front with part of the reflected light being cut off by the shade 12. Consequently, the first lamp unit 9A functions as a lamp unit for forming a cut-off line in a light distribution pattern formed thereby.

The second lamp unit 9B is a direct emission-type lamp unit and includes, for example, two second light sources 15a, 15b which are disposed on a substrate 14, constituting a diffuse optical system.

For example, light emitting diodes (LEDs) are used as the second light sources 15a, 15b. Of the two second light sources, one second light source 15a is a light source of a headlamp, for example, which illuminates a road surface ahead of the vehicle while the vehicle is driving, and the other second light 15b is a light source of a so-called day-time running lamp, for example, which allows a pedestrian or the like to be aware of the existence of the vehicle during a time of the day other than night-time. Consequently, the second light sources 15a, 15b are individually controlled so as to be turned on and off independently.

The third lamp unit 9C is a direct emission-type lamp unit and includes, for example, two third light sources 17a, 17b which are disposed on a substrate 16, constituting a diffuse optical system. A diffuse range of the third lamp 9C is made larger than a diffuse range of the second lamp unit 93.

For example, light emitting diodes (LEDs) are used as the third light sources 17a, 17b. Of the two third light sources, one third light source 17a is a light source of the headlamp, for example, and the other third light source 17b is a light source of the so-called day-time running lamp, for example. Consequently, the third light sources 17a, 17b are controlled individually so as to be turned on and off.

In the vehicle lamp 1, the second and third light sources 15b, 17b which are used as the light sources of the day-time running lamp can also be used as a so-called clearance lamp, which is a position lamp, by reducing the luminous intensities thereof.

The fourth lamp unit 9D includes a fourth light source 19 which is disposed on a substrate 18 and constitutes a direct emission-type lamp unit. For example, a light emitting diode (LED) is used as the fourth light source 19. The fourth lamp unit 9D functions as a so-called cornering lamp which is turned on when the vehicle turns to the left (or when the vehicle turns to the right in the case of a fourth lamp unit 9D in a vehicle lamp 1 which is mounted at the right-hand side of the front of the vehicle) or as a so-called bending lamp which is rotated horizontally in accordance with a turning angle of a steering wheel when the vehicle is driving on a curve on the road so as to illuminate a road surface ahead of the vehicle in the traveling direction.

The fifth lamp unit 9E includes a fifth light source 21 which is disposed on a substrate 21 and constitutes a direct emission-type lamp unit. For example, a light emitting diode (LED) is used as the fifth light source 21. The fifth lamp unit 9E functions as a cornering lamp or functions as a bending lamp.

The mount member 6 is supported on the lamp housing 2 via an optical axis controlling mechanism 22 so as to be freely tilted.

The optical axis controlling mechanism 22 has aiming screws 23, 23 and a leveling actuator, not shown.

The aiming screws 23, 23 are positioned so as to be spaced apart in a left-to-right or transverse direction and are made up of rotational operating portions 24, 24 and shaft portions 25, 25 which project to the front from the corresponding rotational operating portions 24, 24. Front end portions of the shaft portions 25, 25 are provided as threaded shaft portions 25a, 25a.

In the aiming screws 23, 23, the rotational operating portions 24, 24 are supported rotatably on the lamp body 2, and the threaded shaft portions 25a, 25a are screwed through corresponding connecting portions 6a, 6a provided at an upper side of the mount member 6 for connection thereto.

The leveling actuator is made up of a driving portion and a shaft portion which project toward the front from the driving portion, and a front end portion of the shaft portion is screwed into a connecting portion 6a provided at a lower side of the mount member 6.

In the vehicle lamp 1, when the rotational operating portion 24 is operated by a jig such as a screwdriver, not shown, so as to rotate the aiming screw 23 connected to the connecting portion 6a, the mount member 6 is tilted in a direction corresponding about the other connecting portions 6a, 6a as fulcrums toward the rotational direction of the aiming screw 23, whereby an optical axis control (an aiming control) of the first lamp unit 9A is executed.

In addition, when the shaft portion 25 connected to the connecting portion 6a is rotated by the driving force of the driving portion, the mount member 6 is tilted about the other connecting portions 6a, 6a as fulcrums in a direction corresponding to the rotational direction of the shaft portion 25, whereby an optical axis control (a leveling control) of the first lamp unit 9A is executed.

A compound lens 26 is disposed between the cover 3 and the mount member 6. The compound lens 26 is made up of a plate-shaped light emitting portion 27 which is formed into a curved surface and five control portions which are provided on a back side of the light emitting portion 27, the five control portions including a first control portion 28A, a second control portion 28B, a third control portion 28C, a fourth control portion 28D and a fifth control portion 28E, which are formed integrally with the light emitting portion 27.

The light emitting portion 27 has a shape which matches the light transmitting portion 3a of the cover 3, and a light emitting surface 27a, which is a surface facing the light transmitting portion 3a, is formed into a moderate curved surface, which is convex on a side facing the light transmitting portion 3a. In addition, the light emitting portion 27 has a shape, which is displaced to the rear as it extends transversely outwards.

The first control portion 28A, the second control portion 28B, the third control portion 280, the fourth control portion 28D and the fifth control portion 28E are positioned so as to face the first lamp unit 9A, the second lamp unit 9B, the third lamp unit 9C, the fourth lamp unit 9D and the fifth lamp unit 9E, respectively.

Consequently, light emitted from the first light source 10 is controlled so as to be directed in a predetermined direction by the first control portion 28A. Light emitted from the second light sources 15a, 15b is controlled so as to be directed in a predetermined direction by the second control portion 28B. Light emitted from the third light sources 17a, 17b is controlled so as to be directed in a predetermined direction by the third control portion 280. Light emitted from the fourth light source 19 is controlled so as to be directed in a predetermined direction by the fourth control portion 28D. Light emitted from the fifth light source 21 is controlled so as to be directed in a predetermined direction by the fifth control portion 28E.

Figure 2:
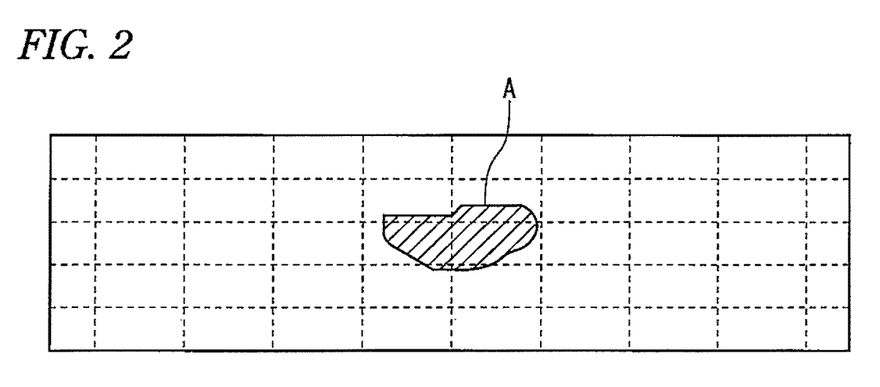
FIG. 2 is a drawing showing a light distribution pattern formed when light is emitted from a first lamp unit.

FIG. 2 shows a light distribution pattern A which is formed when light is emitted from the first light source 10 of the first lamp unit 9A. The first lamp unit 9A is the lamp unit which constitutes the collective optical system and forms the light distribution pattern A in an area referred to as a hot zone.

Figure 3:
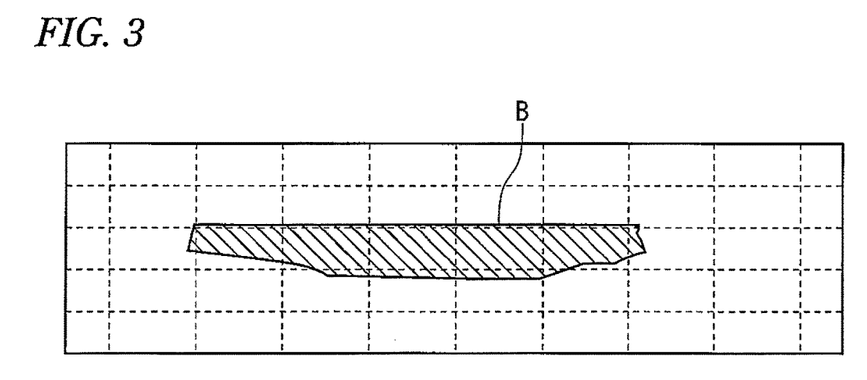
FIG. 3 is a drawing showing a light distribution pattern formed when light is emitted from a second lamp unit which is positioned transversely inwards.

FIG. 3 shows a light distribution pattern B which is formed when light is emitted from the second light source 15a for the headlamp of the second lamp unit 9B. The second lamp unit 9B is the lamp unit which constitutes the diffuse optical system and forms the light distribution pattern B which includes the light distribution pattern A and which is larger in the transverse and downward directions than the light distribution pattern A.

Figure 4:
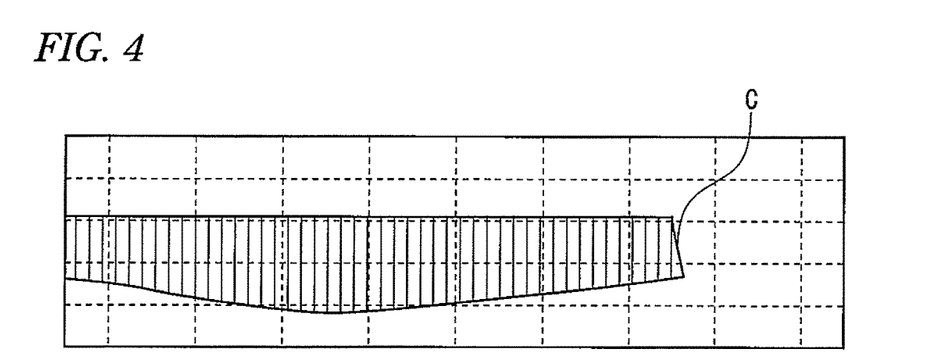
FIG. 4 is a drawing showing a light distribution pattern formed when light is emitted from a second lamp unit which is positioned transversely outwards.

FIG. 4 shows a light distribution pattern C which is formed when light is emitted from the third light source 17a for the headlamp of the third lamp unit 9C. The third lamp unit 9C is the lamp unit which constitutes the diffuse optical system and forms the light distribution pattern C which contains the light distribution pattern A and which is larger in the transverse and downward directions than the light distribution pattern B.

Figure 5:
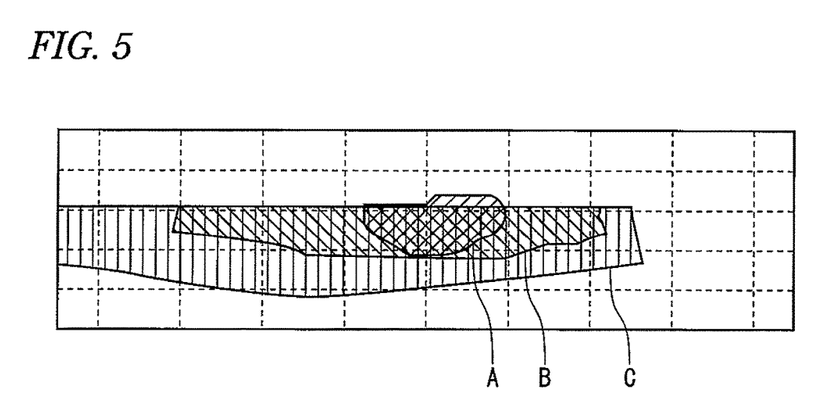
FIG. 5 is a drawing showing a light distribution pattern formed by a combination of the three light distribution patterns.

FIG. 5 shows a light distribution pattern formed when the light distribution pattern A, the light distribution pattern B and the light distribution pattern C are combined together.

In the vehicle lamp 1 described above, since the light emitting portion 27 of the compound lens 26 is displaced to the rear as it extends transversely outwards, the inclination of the light emitting surface 27a with respect to the transverse direction increases as it extends transversely outwards. When the first lamp unit 9A which is configured as the collective optical system is disposed in a position where the inclination of the light emitting surface 27a, which is configured in the way described above, is large, light is easily diffused, whereby it becomes difficult to form the desired light distribution pattern by employing the reflector 11 and the shade 12.

Then, in the vehicle lamp 1, as has been described above, the reflection-type lamp unit 9A which constitutes the collective optical system is disposed in the transversely innermost position, and the direct emission-type second lamp unit 9B which constitutes the diffuse optical system is disposed transversely outwards of the first lamp unit 9A.

Consequently, the reflection-type first lamp unit 9A which constitutes the collective optical system is position so as to correspond to a portion where the inclination of the light emitting surface 27a with respect to the transverse direction is small, whereby the desired light distribution pattern A can easily be formed by employing the reflector 11 and the shade 12, thereby making it possible to realize an increase in the functionality of the vehicle lamp 1.

In addition, in the vehicle lamp 1, the light emitting surface 27a which is formed into the moderate curved surface has the shape which is displaced to the rear as it extends transversely outwards of the vehicle, whereby the compound lens 26 can be disposed along the inner surface of the cover 3, thereby making it possible to realize a reduction in size of the vehicle lamp 1.

Further, the fourth lamp unit 9D and the fifth lamp unit 9E, which function differently from the first lamp unit 9A and the second lamp unit 9B and function as the cornering lamp or the bending lamp, are disposed transversely outwards of the second lamp unit 9B.

Consequently, a further increase in the functionality of the vehicle lamp 1 can be realized.

Furthermore, the fourth control portion 28D and the fifth control portion 28E, which control light emitted from the fourth lamp unit 9D and the fifth lamp unit 9E, respectively, are provided on the compound lens 26, whereby the desired light distribution pattern can easily be formed by light emitted from the fourth lamp unit 9D and the fifth lamp unit 9E.

In addition, the first control portion 28A through the fifth control portion 28E are provided on the single compound lens 26, thereby making it possible to realize a reduction in the number of parts.

Additionally, the first lamp unit 9A to the fifth lamp unit 9E are mounted and disposed on the single mount member 6, thereby making it possible to realize a reduction in the number of parts. Note that the first lamp unit 9A to the fifth lamp unit 9E may be mounted individually on separate mount members.

All the shapes and constructions of the respective portions described in above are only the examples used in carrying out the invention, and the technical scope of the invention should not be construed as being limited by those examples.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
   a lamp outer case comprising:
      a cover, and
      a lamp housing;
   a reflection first lamp unit comprising:
      a first light source,
      a reflector which reflects light emitted from the first light source, and
      a shade which cuts off part of light emitted from the first light source and forming a collective optical system;
   a direct emission second lamp unit having a second light source, which directly emits shining light,
      wherein the second lamp unit is disposed on an external side, in a transverse direction of the vehicle, of the first lamp unit and forms a diffuse optical system; and
   a compound lens disposed along an inner surface of the cover,
   wherein an outer surface of the compound lens facing the inner surface of the cover is formed as a light emitting surface and is formed into a curved surface,
   wherein a first control portion and a second control portion are provided on an inner surface of the compound lens,
   wherein the inner surface of the compound lens faces the first lamp unit and the second lamp unit so that the first control portion and the second control portion control light emitted from the first light source and light emitted from the second light source, respectively, and
   wherein the light emitting surface of the compound lens is formed into a shape which is displaced to the rear as the compound lens extends outwards in the transverse direction of the vehicle.

2. The vehicle lamp of claim 1, further comprising a third lamp unit having a different function from those of the first lamp unit and the second lamp unit, the third lamp unit disposed on an external side of the second lamp unit.

3. The vehicle lamp of claim 2, wherein a third control portion is provided on the compound lens for controlling light emitted from the third lamp unit.

4. The vehicle lamp of claim 1, wherein all light from the second lamp unit is directly incident on the compound lens without being reflected.

5. The vehicle lamp of claim 1, wherein the shade of the reflection first lamp unit is a movable shade.

6. The vehicle lamp of claim 5, wherein a reflecting surface is formed on an upper surface of the shade.

7. The vehicle lamp of claim 1, further comprising:
   an integrated heat dissipation member to which the first and second lamp units are attached.

8. The vehicle lamp of claim 7, wherein the compound lens is disposed between the cover and the integrated heat dissipation member.

9. The vehicle of claim 1,
wherein the second control portion has a convex surface directed to the second lamp unit, and
wherein the convex surface of the second control portion faces the second lamp unit.

* * * * *